(12) United States Patent
Gao et al.

(10) Patent No.: US 11,189,411 B2
(45) Date of Patent: Nov. 30, 2021

(54) MAGNETIZING DEVICE AND MAGNETIZING METHOD

(71) Applicant: BEIJING XIAOMI MOBILE SOFTWARE CO., LTD., Beijing (CN)

(72) Inventors: Wenjun Gao, Beijing (CN); Chaoxi Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/826,212

(22) Filed: Mar. 21, 2020

(65) Prior Publication Data

US 2021/0118599 A1    Apr. 22, 2021

(30) Foreign Application Priority Data

Oct. 21, 2019    (CN) .......................... 201911001485.5

(51) Int. Cl.
| | | |
|---|---|---|
| *H04B 5/00* | (2006.01) | |
| *H01F 7/08* | (2006.01) | |
| *H01F 7/128* | (2006.01) | |
| *H01F 27/28* | (2006.01) | |
| *H01F 27/36* | (2006.01) | |
| *H04M 1/02* | (2006.01) | |

(52) U.S. Cl.
CPC .............. *H01F 7/081* (2013.01); *H01F 7/128* (2013.01); *H01F 27/28* (2013.01); *H01F 27/36* (2013.01); *H04M 1/0237* (2013.01); *H04M 1/0264* (2013.01); *H04M 1/0266* (2013.01)

(58) Field of Classification Search
CPC .......... H01F 7/081; H01F 7/128; H01F 27/28; H01F 27/36; H01M 1/0237; H01M 1/0264; H01M 1/0266; H04W 4/80
See application file for complete search history.

(56) References Cited

U.S. PATENT DOCUMENTS

| | | | |
|---|---|---|---|
| 2005/0180275 A1* | 8/2005 | Shiraki | G02B 7/102 369/44.15 |
| 2014/0002228 A1* | 1/2014 | Hatanaka | H01F 38/14 336/200 |
| 2015/0091680 A1* | 4/2015 | Gery | H01F 13/003 335/284 |
| 2016/0070181 A1 | 3/2016 | Frissen et al. | |
| 2016/0211066 A1 | 7/2016 | Fullerton et al. | |
| 2016/0343497 A1* | 11/2016 | Clark | H01H 15/06 |
| 2019/0027799 A1 | 1/2019 | Rajendran et al. | |

(Continued)

FOREIGN PATENT DOCUMENTS

| | | |
|---|---|---|
| CN | 201152804 Y | 11/2008 |
| CN | 201655469 U | 11/2010 |

(Continued)

OTHER PUBLICATIONS

Supplementary European Search Report in the European application No. 20169333.0, dated Sep. 18, 2020.

(Continued)

*Primary Examiner* — Tuan Pham
(74) *Attorney, Agent, or Firm* — Syncoda LLC; Feng Ma

(57) ABSTRACT

A magnetizing device includes a magnetic field generator configured to generate a parallel magnetic field in a preset region. The parallel magnetic field magnetizes the element which is located in the preset region.

18 Claims, 6 Drawing Sheets

(56) References Cited

U.S. PATENT DOCUMENTS

2019/0318914 A1* 10/2019 Okunishi .......... H01J 37/32183
2019/0371506 A1  12/2019 Colgan et al.
2020/0119581 A1*  4/2020 Kim ................... H02J 50/80

FOREIGN PATENT DOCUMENTS

| CN | 102518590 A | 6/2012 |
| CN | 204498377 U | 7/2015 |
| CN | 106601430 A | 4/2017 |
| CN | 107578882 A | 1/2018 |
| CN | 208173335 U | 11/2018 |
| CN | 110010325 A | 7/2019 |
| JP | 2004235625 A | 8/2004 |
| WO | 2018127814 A1 | 7/2018 |

OTHER PUBLICATIONS

Notice of Allowance of the Chinese application No. 201911001485.5, dated May 17, 2021.

* cited by examiner

MAGNETIZING DEVICE AND MAGNETIZING METHOD

CROSS-REFERENCE TO RELATED APPLICATION

This application claims priority to Chinese Patent Application No. 201911001485.5 filed on Oct. 21, 2019, the disclosure of which is hereby incorporated by reference in its entirety.

BACKGROUND

A terminal device, such as a mobile phone, sometimes needs a magnetic element to realize a corresponding function. For example, the mobile phone can be designed with a slide-type structure to increase a screen-to-body ratio of the mobile phone and have a better full-screen effect.

SUMMARY

The disclosure relates generally to the field of the electronic technologies, and more specifically to a magnetizing device and a magnetizing method.

A magnetizing device for magnetizing an element is provided according to some embodiments. The magnetizing device includes a magnetic field generator configured to generate a parallel magnetic field in a preset region. The parallel magnetic field magnetizes the element which is located in the preset region.

In another aspect, further provided is a magnetizing method performed by the above magnetizing device. The method includes: providing a parallel magnetic field in a preset region; placing an element in the preset region; and magnetizing the element by the magnetizing coil.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

FIG. 3 illustrates a diagram of distribution of magnetic induction lines produced by the magnetizing coil in FIG. 2 after being powered on.

DETAILED DESCRIPTION

Figure 1:
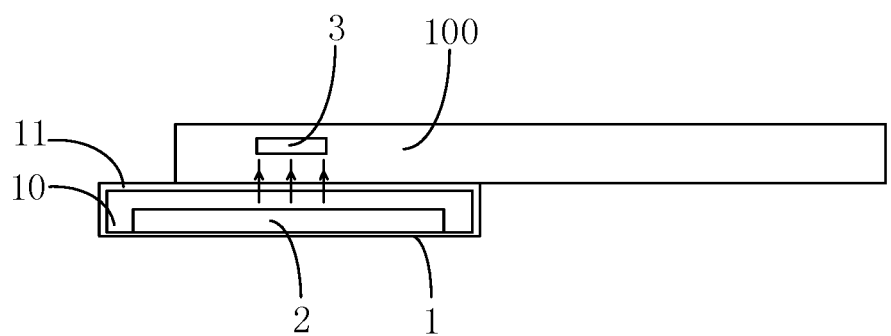
FIG. 1 illustrates a schematic structural diagram of a magnetizing device according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

The terms used in the disclosure are for the purpose of describing particular embodiments only, and are not intended to limit the disclosure. Unless otherwise defined, technical terms or scientific terms used in the disclosure should be understood in the ordinary meaning of those of ordinary skill in the art to which the disclosure pertains. The words "first," "second," and the like used in the specification and claims of the disclosure are not intended to indicate any order, quantity or importance, but only to distinguish different components. Similarly, the words "a," "an," or the like do not denote any quantitative limitation, but mean that there is at least one. "Multiple" or "several" means two or more. Unless stated otherwise, words such as "front," "rear," "lower," and/or "upper" are just for convenience of explanation, and are not limited to a position or a spatial orientation. Words such as "comprise" or "include" mean that elements or objects preceding "comprise" or "include" encompass listed elements or objects following "comprise" or "include", and their equivalents, and do not exclude other elements or objects. Words such as "connect" or "connected" are not limited to physical or mechanical connections, and may include electrical connections, whether direct or indirect. "A/an," "the," and "this" in a singular form in the specification and the appended claims of the disclosure are also intended to include a plural form, unless other meanings are clearly indicated in the context. It is also to be understood that the term "and/or" used in the disclosure refers to and includes any or all possible combinations of one or more associated items that are listed.

Various embodiments of the present disclosure can provide a mobile phone manufacturing system or assembly line. The mobile phone can include a main body, and a slide cover installed on the main body. A display screen is arranged in the slide cover, and elements such as a front camera and a sensor are provided in the main body under the slide cover. The camera and the sensor can be exposed by sliding the slide cover, to realize functions such as image acquisition, and detection.

When the slide cover containing a magnetic element slides relative to the main body, a Hall element provided in the main body can determine, by detecting a change in a magnetic flux caused by motion of the magnetic element, whether the slide cover has reached a predetermined position.

In some situations, magnetism of the magnetic element may be changed or lost under influence of another external magnetic field, which causes an error in detection and affects normal use of the mobile phone.

Referring to FIGS. 1-6, a magnetizing device and magnetizing method for magnetizing an element are provided according to some embodiments of the disclosure. The element, after being magnetized, serves as a magnetic element which can be applied to a terminal device having a strict requirement on magnetism. The magnetizing device includes a magnetic field generator. The magnetic field generator may be a permanent magnet or an electromagnet. The magnetic field generator is used for generating a strong parallel magnetic field in a preset region. Here, it is to be understood that "parallel" means that magnetic induction lines in the magnetic field are approximately parallel. For example, any magnetic induction lines between which an included angle is no greater than 5 degree can be considered as approximately parallel. Of course, the meaning of "parallel" can be redefined according to an actual requirement in practical application. The parallel magnetic field is used for magnetizing the element located in the preset region.

Figure 2:
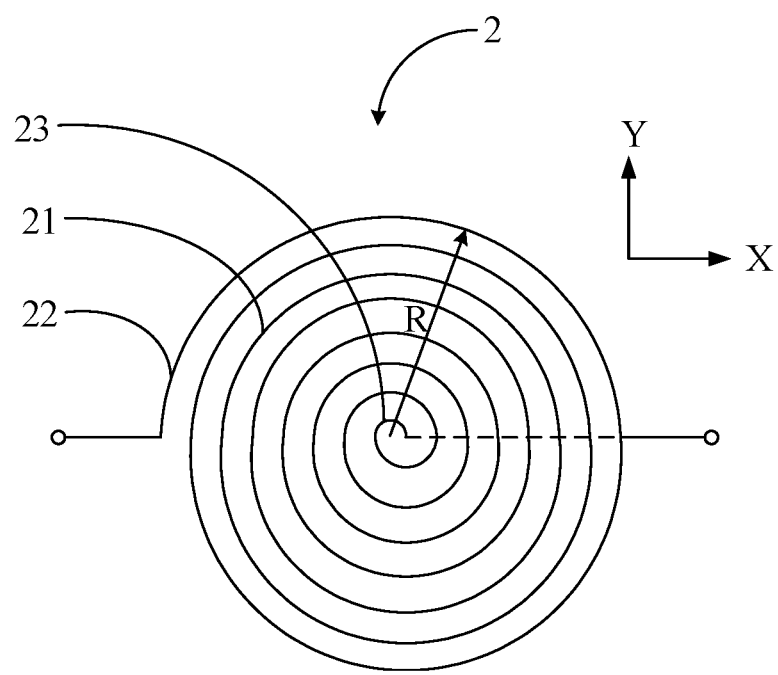
FIG. 2 illustrates a schematic top-plan view of a magnetizing coil of the magnetizing device in FIG. 1.
Figure 3:
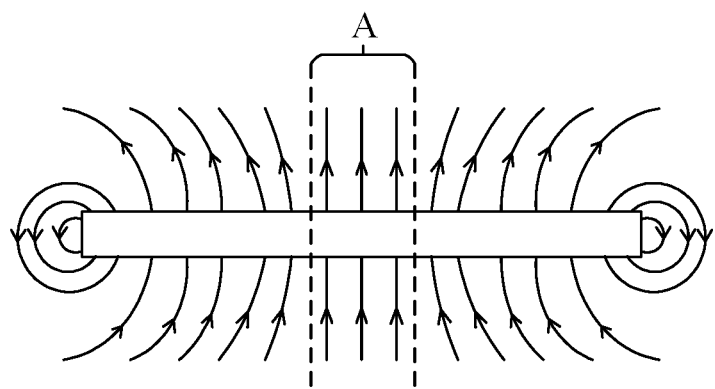

With reference to FIGS. 1-3, in these embodiments, the magnetizing device includes a housing 1 and a magnetic field generator installed in the housing 1. The housing is provided with a supporting part 11 for supporting an element 3 to be magnetized. In this embodiment, the element 3, after being magnetized, serves as a magnetic element of a terminal device 100, and is mainly used for Hall detection. The supporting part 11 may be made of plastic so as not to interfere the magnetic field generated by the magnetic field generator. The parallel magnetic field can pass through the supporting part 11 and magnetize the element 3 located in the preset region. The supporting part 11, although made of plastic, still weakens the magnetic field to a certain extent. Therefore, in some embodiments, a through-hole is provided in a central region of the supporting part 11, so that the magnetic field can directly pass through the through-hole, preventing the supporting part 11 from weakening the magnetic field. The magnetic field generator is arranged in a receiving cavity 10 formed by the housing 1.

In this embodiment, the magnetic field generator is a magnetizing coil. Compared with a permanent magnet, a magnetic field intensity and direction of the magnetic field produced by the coil can be adjusted according to a magnitude and direction of a supplied current. In this way, elements having different requirements on magnetism can be magnetized, while a higher precision of magnetization can be obtained. The magnetizing coil 2 includes a main body 21, and a first end 22 and a second end 23 which are connected to the main body 21. The first end 22 and the second end 23 are electrically connected to a power source (not illustrated). The power source is used for providing a current flowing through the magnetizing coil 2, to generate the magnetic field.

The main body 21, the first end 22 and the second end 23 of the magnetizing coil 2 are coplanar. In other words, the magnetizing coil is a flat coil and is approximately located in one plane. The flat coil has a larger area-to-volume ratio, which is helpful in saving material. At the same time, the flat structure of the coil is conducive to formation of an air duct, making heat dissipation easier. The magnetizing coil 2 has a circular shape with a radius R no less than 10 mm. The radius can be understood as a distance from a center of the magnetizing coil 2 to an outermost winding of the magnetizing coil. Because the coil is spiral and cannot have a standard circular shape, the circular shape here refers to an approximately circular shape.

In these embodiments, the shape of other parts can also be understood as approximate shapes. It is to be understood that the size of the magnetizing coil 2 in both a first direction X and a second direction Y are no less than 20 mm, so as to ensure that an approximately parallel magnetic field is formed in the preset region A (referring to FIG. 3) when the magnetizing coil is powered on. For example, the region in which an included angle between magnetic induction lines and the second direction Y is less than 5 degree can be regarded as the preset region A. It can be understood that, due to that the magnetizing coil 2 is in a circular shape, the magnetic induction lines are distributed cylindrically according to the right-hand screw rule. It can be seen that the preset region A is also cylindrical, and extends outwards radially from the center of the magnetizing coil 2.

Because the preset region A is cylindrical, the magnetizing coil according to this embodiment is more suitable for magnetizing a cylindrical element with a larger size. Of course, the magnetizing coil according to this embodiment is also applicable for a smaller element in any shape. The first direction X and the second direction Y are perpendicular to each other, and here can be understood as a lengthwise and widthwise direction of the element 3 respectively.

The size of the element 3 in both the first direction X and the second direction Y are smaller than a size of the magnetizing coil 2 in the first direction X, and are smaller than a size of the magnetizing coil 2 in the second direction Y, so as to ensure that each area of the element 3 can be magnetized by the magnetizing coil 2. In this embodiment, the size of the element 3 in both the first direction X and the second direction Y are less than 20 mm.

A mark corresponding to the preset region A is made on the supporting part 11 in advance. A user may place a mobile phone on the supporting part 11 and enable the element 3 to correspond to the mark positionally. The magnetizing coil 2 generates a magnetizing magnetic field after being powered on. An upper and lower end (two ends in the second direction Y) of the magnetizing coil 2 can be approximately regarded as a north (N) magnetic pole and a south (S) magnetic pole respectively. If the magnetism of the element 3 is changed under influence from other magnetic fields, for example the magnetic poles have been changed.

The magnetizing magnetic field passes through the element 3 and gradually changes a magnetic domain in the element 3, and finally unifies directions of the magnetic domain. From a macro perspective, the magnetizing magnetic field first deprives the element 3 to be magnetized of magnetism, and then enables the element 3 to regain magnetism. At this time, the magnetic poles of the element 3 to be magnetized are consistent with those of the magnetizing coil 2, that is, an upper end of the element 3 is the N magnetic pole and a lower end of the element is the S magnetic pole. The reverse magnetization of the element 3 is completed. If the element 3 has lost magnetism due to influence from other magnetic fields, the magnetizing magnetic field from the exterior passes through the element 3 and changes the magnetic domain within the element 3, and unifies the directions of the magnetic domain within the element. Thus, the element 3 has gained magnetism, and the magnetic poles of the element 3 are consistent with those of the magnetizing coil 2 at this time. The magnetization of the element 3 is completed.

Figure 4:
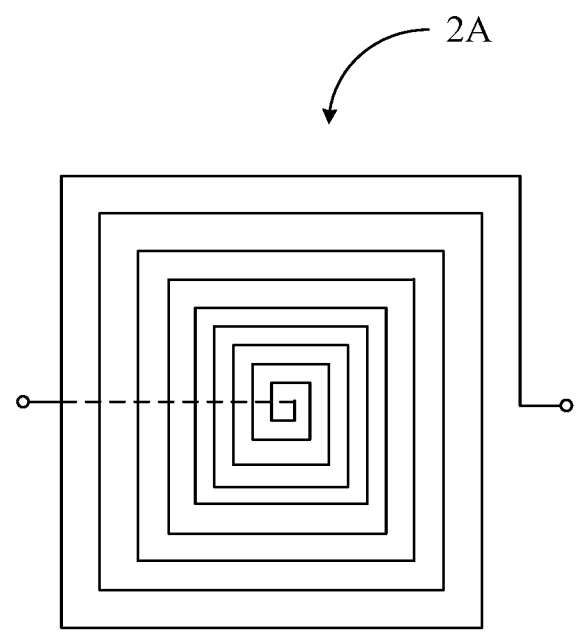
FIG. 4 illustrates a schematic structural diagram of a magnetizing coil of a magnetizing device according to some embodiments of the present disclosure.

With reference to FIG. 4, in some embodiments, a magnetizing coil 2A is approximately square. Similar to the above magnetizing coil 2, the size of the magnetizing coil 2A in both the first direction X and the second direction Y are greater than 20 mm, so as to ensure that an approximately parallel magnetic field is generated in a preset region, to magnetize an element 3 to be magnetized. Since the magnetizing coil 2A is approximately square, it can be known, according to the right-hand screw rule, that magnetic induction lines of the magnetizing coil 2A are distributed in the form of an approximate cube. That is to say, the preset region is in the form of a cube. As a result, the magnetizing coil 2A is more applicable for magnetizing a square element.

Of course, the intensity of a magnetic field gradually attenuates as a propagation distance increases. Therefore, for elements to be magnetized having different requirements on magnetism, the distance between the magnetizing coil and the elements can be adjusted to obtain satisfactory magnetic elements.

Figure 5:
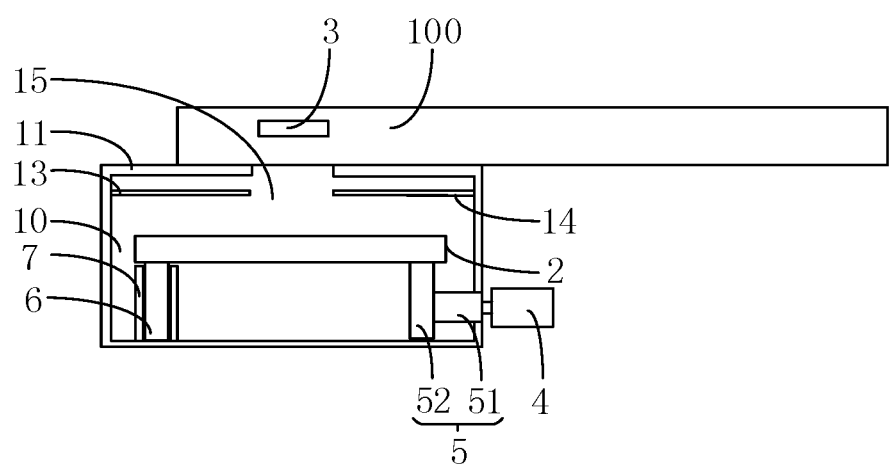
FIG. 5 illustrates a schematic structural diagram of a magnetizing device according to some embodiments of the present disclosure.

With reference to FIG. 5, compared with the above magnetizing device, the magnetizing device in this embodiment further includes a driving mechanism. The driving mechanism is used for driving the magnetizing coil 2, to adjust a distance between the magnetizing coil 2 and the supporting part 11, that is, adjusting the distance between the magnetizing coil 2 and an element 3 to be magnetized.

The driving mechanism includes a power unit 4 and a transmission unit 5 driven by the power unit. The transmission unit 5 includes a first transmission unit 51 and a second transmission unit 52 in power connection to the first transmission unit 51. The second transmission unit 52 is connected to the magnetizing coil 2 and supports the magnetizing coil 2, so as to transmit power from the power unit 4 to the magnetizing coil 2. In this way, the magnetizing coil 2 can move towards or away from the supporting part 11.

The power unit 4 can be a motor. Because the motor includes a metal assembly which may affect the magnetic field generated by the magnetizing coil 2, the motor must be arranged at a location as far away from the magnetizing coil 2 as possible. For example, the motor may be arranged outside the housing 1. For example, the first transmission unit 51 and the second transmission unit 52 can be a gear and a worm and are used for converting rotation of the motor into linear motion of the magnetizing coil 2. The gear and the worm are made of a non-magnetic material such as plastic, in order not to affect the magnetic field. In some embodiments, the driving mechanism may also only include a power unit capable of directly driving the magnetizing coil 2 to make linear motion, such as a linear motor.

Preferably, the magnetizing device further includes a slidable element 6 connected to the magnetizing coil 2, and a guide element 7 installed in the housing 1. The slidable element 6 is slidably installed in the guide element 7, and slides relative to the guide element 7 when the magnetizing coil 2 is driven by the driving mechanism. As the magnetizing coil 2 and the sliding element 6 are guided in movement, stability of the movement can be improved. In this embodiment, the slidable element 6 is a guide rod, and the guide element 7 is a guide groove. In some embodiments, a guide structure can also be selected as required, such as a guide rail.

In these embodiments, the magnetizing device further includes a shielding mechanism for shielding part of the magnetic field generated by the magnetizing device 2. The shielding mechanism is made of a material such as aluminum or copper, and can shield the magnetic field without being magnetized by the magnetizing coil.

In some embodiments, the shielding mechanism is connected to a first shielding part 13 and a second shielding part 14 of the housing 1 respectively. The first shielding part 13 and the second shielding 14 are arranged opposite to each other, and an opening 15 is formed therebetween. One of the first shielding part 13 and the second shielding part 14 can move relative to the other, so that a size of the opening 15 can be adjusted to enable the opening 15 to coincide with the preset region A. A magnetizing process is prevented from being interfered by a non-parallel magnetic field outside the preset region A. The magnetizing device 2 can also be precluded from magnetizing the other ferromagnetic elements of a mobile phone and impairing the performance of these elements. In these embodiments, the first shielding part 13 and the second shielding part 14 are arranged in slide grooves in the housing (not illustrated). The first shielding part 13 and the second shielding part 14 can translate or rotate along the slide grooves.

In some embodiments, one end of each of the first shielding part 13 and the second shielding part 14 is rotatably assembled in the housing 1, and an axis of rotation is perpendicular to the first direction X and the second direction Y. The first shielding part 13 and the second shielding part 14 may be driven manually or by a motor, which will not be elaborated here.

In the disclosure, the approximately parallel magnetic field provided in the preset region by the magnetic field generator can magnetize the element quickly. The magnetizing device has a simple structure and low cost.

Figure 6:
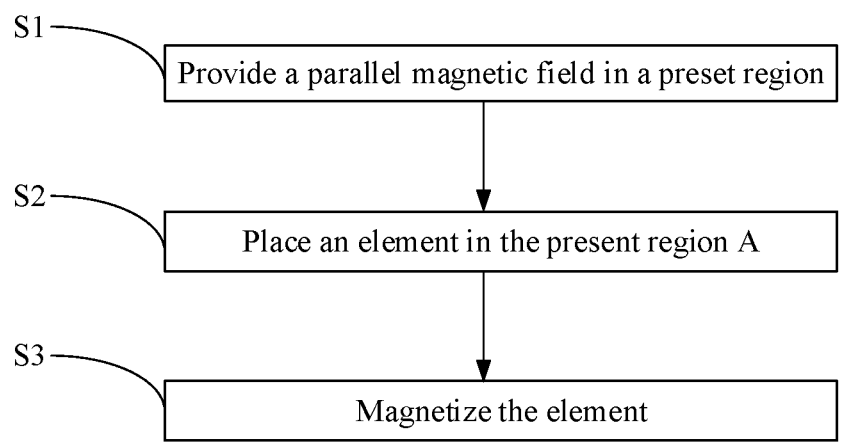
FIG. 6 illustrates a schematic flowchart of a magnetizing method according to some embodiments of the present disclosure.

In another aspect, a magnetizing method performed by the magnetizing device according to any of the above embodiments is further provided. With reference to FIG. 6, in this embodiment, the magnetizing method includes the following blocks.

In block S1: a parallel magnetic field is provided in a preset region. In some embodiments, the magnetizing coil 2 is connected to a power source. The magnetizing coil 2 generates an approximately parallel magnetic field in a preset region A after being powered on.

In block S2: an element 3 is placed in the preset region A. Specifically, a region in which the magnetic field is approximately parallel, namely the preset region A, can be determined by measurement. A mark of the preset region A is made on the supporting part 11, for convenience of operation In block S3: the element 3 is magnetized.

It is to be understood that the order of block S1 and block S2 are interchangeable.

In the disclosure, with an approximately parallel magnetic field provided in a preset region by a magnetic field generator, an element can be magnetized quickly. The magnetizing device has a simple structure and low cost.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

The above are only preferred embodiments of the disclosure and not intended to limit the disclosure in any form. Although the invention has been disclosed as above in the preferred embodiments, they are not intended to limit the invention. Those skilled in the art can make some variations or modifications to obtain an equivalent embodiment by utilizing the technical content disclosed above, without departing from the scope of the technical solutions of the disclosure. Any simple modification, equivalent change and variation made to the above embodiments according to the technical essence of the disclosure shall fall within the scope of the technical solution of the disclosure, without departing from the content of the technical solution of the disclosure.

The invention claimed is:

1. A magnetizing device for magnetizing a first element, comprising a magnetic field generator arranged in a housing of the magnetizing device, the magnetic field generator being configured to generate a parallel magnetic field in a preset region, wherein the parallel magnetic field magnetizes the first element which is located in the preset region; and
   a shielding mechanism for shielding part of the magnetic field generated by the magnetizing device, wherein the shielding mechanism comprises a first shielding part and a second shielding part connected to the housing respectively, the first shielding part and the second shielding part are arranged opposite to each other, an opening is provided between the first shielding part and the second shielding part, and one of the first shielding part and the second shielding part is capable of moving relative to the other, to adjust a size of the opening to enable the opening to coincide with the preset region.

2. The magnetizing device according to claim 1, wherein the magnetic field generator is a magnetizing coil for generating the parallel magnetic field in the preset region after being powered on.

3. The magnetizing device according to claim 2, wherein a size of the magnetizing coil in a first direction is greater than a size of the first element in the first direction and a size of the first element in a second direction, and a size of the magnetizing coil in the second direction is greater than the size of the first element in the first direction and the size of the first element in the second direction.

4. The magnetizing device according to claim 2, wherein the magnetizing coil comprises a main body, and a first end and a second end which are connected to the main body, the first end and the second end are electrically connected to a power source, and the main body, the first end and the second end are arranged to be coplanar.

5. The magnetizing device according to claim 2, wherein the magnetizing coil has a circular shape with a diameter no less than 20 mm, and the preset region extends outwards radially from a center of the magnetizing coil and is cylindrical.

6. The magnetizing device according to claim 2, wherein the housing is provided with a supporting part for supporting the first element, and the parallel magnetic field passes through the supporting part and magnetizes the first element.

7. The magnetizing device according to claim 6, further comprising a driving mechanism for driving the magnetizing coil, so as to adjust a distance between the magnetizing coil and the supporting part.

8. The magnetizing device according to claim 7, further comprising a slidable element connected to the magnetizing coil, and a guide element installed in the housing, wherein the slidable element is slidably installed in the guide element, and slides relative to the guide element when the magnetizing coil is driven by the driving mechanism.

9. A magnetizing method, performed by a magnetizing device, and comprising:
   providing a parallel magnetic field in a preset region by using a magnetic field generator arranged within a housing of the magnetizing device;
   placing a first element in the preset region;
   magnetizing the first element; and
   shielding part of the magnetic field generated by the magnetizing device with a shielding mechanism;
   wherein the shielding mechanism comprises a first shielding part and a second shielding part connected to the housing respectively, the first shielding part and the second shielding part are arranged opposite to each other and an opening is provided between the first shielding part and the second shielding part, and wherein the magnetizing method further comprises:
   enabling one of the first shielding part and the second shielding part to move relative to the other, to adjust a size of the opening to enable the opening to coincide with the preset region.

10. The magnetizing method according to claim 9, wherein:
    the magnetic field generator generates the parallel magnetic field in the preset region after being powered on.

11. The magnetizing method according to claim 10, wherein the magnetic field generator is a magnetizing coil.

12. The magnetizing method according to claim 11, wherein a size of the magnetizing coil in a first direction is greater than a size of the first element in the first direction and a size of the first element in a second direction, and a size of the magnetizing coil in the second direction is greater than the size of the first element in the first direction and the size of the first element in the second direction.

13. The magnetizing method according to claim 11, wherein the magnetizing coil comprises a main body, and a first end and a second end which are connected to the main body, and the main body, the first end and the second end are arranged to be coplanar.

14. The magnetizing method according to claim 11, wherein the magnetizing coil has a circular shape with a diameter no less than 20 mm, and the preset region extends outwards radially from a center of the magnetizing coil and is cylindrical.

15. The magnetizing method according to claim 11, wherein the housing is provided with a supporting part, and wherein magnetizing the first element comprises:
   enabling the parallel magnetic field to pass through the supporting part and magnetize the first element.

16. The magnetizing method according to claim 15, further comprising:
   driving the magnetizing coil with a driving mechanism, so as to adjust a distance between the magnetizing coil and the supporting part.

17. The magnetizing method according to claim 16, wherein the magnetizing device further comprises a slidable element connected to the magnetizing coil, and a guide element installed in the housing, and the slidable element is slidably installed in the guide element, and wherein driving the magnetizing coil with the driving mechanism comprises:
   enabling the slidable element to slide relative to the guide element when the magnetizing coil is driven by the driving mechanism.

18. A mobile phone manufacturing system comprising the magnetizing device according to claim 1, wherein the manufacturing system is configured to manufacture mobile phones each including:
   a main body having a second element that is a Hall element;
   a slide cover installed on the main body and containing the first element;
   a display screen arranged in the slide cover; and
   a front camera and a sensor in the main body under the slide cover and configured to be exposed by sliding the slide cover;
   wherein upon the slide cover slides relative to the main body, the second element is configured to determine, by detecting a change in a magnetic flux caused by motion of the first element, whether the slide cover has reached a predetermined position;
   wherein
   the magnetizing device is configured to provide fast magnetization of the first element with the generated parallel magnetic field at the preset region;
   the magnetizing device comprises a housing, and a magnetic field generator installed in the housing;
   the housing is provided with a supporting part for supporting the first element to be magnetized;
   the supporting part is made of plastic so as not to interfere the magnetic field generated by the magnetic field generator;
   the parallel magnetic field is configured to pass through the supporting part and magnetize the first element located in the preset region;
   a through-hole is provided in a central region of the supporting part for the magnetic field to pass directly therethrough, preventing the supporting part from weakening the magnetic field; and
   the magnetic field generator is a magnetizing coil having sizes in both a first direction and a second direction of no less than 20 mm, so as to ensure that the parallel magnetic field is formed in the preset region.

* * * * *